United States Patent [19]

Heinzl

[11] 4,320,406
[45] Mar. 16, 1982

[54] INK PRINTING DEVICE FOR MULTI-COLORED PRINTING OF A RECORDING MEDIUM

[75] Inventor: Joachim Heinzl, Munich, Fed. Rep. of Germany

[73] Assignee: Siemens Aktiengesellschaft, Berlin & Munich, Fed. Rep. of Germany

[21] Appl. No.: 149,319

[22] Filed: May 13, 1980

[30] Foreign Application Priority Data

Jun. 26, 1979 [DE] Fed. Rep. of Germany ....... 2925812

[51] Int. Cl.³ .............................................. G01D 15/18
[52] U.S. Cl. .................................. 346/140 R; 346/1.1
[58] Field of Search ........................... 346/75, 140 PD

[56] References Cited

U.S. PATENT DOCUMENTS

| B512,964 | 2/1976 | Wiesmuller et al. | 346/75 |
|---|---|---|---|
| 1,817,098 | 8/1931 | Ranger et al. | 346/75 UX |
| 2,573,143 | 10/1951 | Jacob | 346/75 |
| 3,747,120 | 7/1973 | Stemme | 346/75 |
| 4,158,847 | 6/1979 | Heinzl et al. | 346/140 PD |

OTHER PUBLICATIONS

Heinzl, Joachim, et al., Lautloser Tintendruck fur Schreibstationen, Siemens–Zeitschrift 51 (1977) Hett 4, pp. 219–221.

Primary Examiner—George H. Miller, Jr.
Attorney, Agent, or Firm—Hill, Van Santen, Steadman, Chiara & Simpson

[57] ABSTRACT

An ink printing device for multi-colored printing of a recording medium utilizes a single ink printing head having a plurality of printing jets arranged in a pattern on the printer head body. Printer jets are divided into groups vertically adjacent to one another having individual ink supplies with colors different from one another. In a line-wise printing operation, recording medium is indexed perpendicularly to the printing direction at the end of a printed line by a vertical distance which corresponds to printing width of each jet group. Operation of the printer head affords superimposed printing to effect secondary, composite colors or halftone shaded patterns.

11 Claims, 2 Drawing Figures

INK PRINTING DEVICE FOR MULTI-COLORED PRINTING OF A RECORDING MEDIUM

BACKGROUND OF THE INVENTION

1. Field of the Invention

The present invention relates to ink-jet printer units and, more particularly to an ink printing device for multi-colored printing.

2. The Prior Art

A present printing device having a piezoelectrically operated printer head for an ink operated mosaic printing system is disclosed in U.S. Pat. No. 4,158,847. There, an ink printing head is provided with a plurality of printing jets. The jets each lie at the outlet of a delivery channel which is enclosed over a portion thereof by a cylindrical piezoelectric drive element. Upon application of a voltage to the piezoelectric drive elements, a shock wave is generated in the jet channels and ink is injected in droplets from the jet onto a recording medium. Ink flows to the jet channels from a common ink reservoir through a supply line and filters into a common ink distributor mounted adjacent the printing head. Each of the jet channels is connected to the supply of ink in the distributor through a capillary filter device including a throttle plate provided with a number of restricted passages corresponding to the jet channels.

Such printing devices are able to display only a single color, such as black, on a recording medium. However, many instances occur where a multi-colored presentation of characters or graphic patterns is desired. It is possible to range for a plurality of side-by-side printing devices as disclosed in U.S. Pat. No. 4,158,847 to produce a multi-colored presentation on a recording medium. For example, three ink printing heads may be arranged next to one another which discharge droplets in different respective colors, such as magenta, yellow, and blue, and are constructed to apply their ink in succession onto the recording medium. This sort of arrangement would be very cumbersome in a printing operation which includes frequent periods of acceleration and deceleration, as well as requiring about three times more space than a single printer head. Further, the increased expenditure involved in a series arrangement for achieving multi-colored printing is prohibited.

SUMMARY OF THE INVENTION

The present invention concerns the construction of a single printer head system for rendering multi-colored presentations on a recording medium. A piezoelectrically operated printer head is formed with a plurality of printing jets connected by channels to an ink distributor space. The distributor is divided into different sections, each section communicating with a prescribed plurality of jets. The distributor chambers are separately supplied with ink from respective ink reservoirs. The ink reservoirs may contain different colors, permitting a single ink printing head to effect a multi-colored presentation on a recording medium.

The printing jets on the printer head are arranged in groups of proximate jets. Each group is supplied with ink from a single reservoir. The groups may be arranged in a vertical array with one another or, in the fashion of the printer head of U.S. Pat. No. 4,158,847, may be arranged into parallel offset lines having six jets in each line. The groups may be formed from the lower, intermediate, and upper sets of four jet nozzles.

Preferably, multi-colored printer system of the present invention utilizes three ink reservoirs which contain inks of the primary colors; i.e., magenta, yellow, and blue. Nevertheless, more or less ink reservoirs may be arranged in connection with the ink printing head. If a four-color print is required, a fourth reservoir may be utilized to contain a black ink. In order to effect mixture or secondary colors on the recording medium, a presentation location is repeatedly printed with various inks by the different group jets. The reiterative printing operation requires that the recording medium be indexed perpendicularly to the printing direction before the printing head moves onto the next presentation. Each index segment is of a length equal to the length of an area in which a group of printing jets is located. In the case of a horizontal printing operation, the ink printing head preferably prints more than one line at a time. Perpendicular indexing of the printing head occurs at the end of one line and the beginning of the next line with the length of the index corresponding to the space between successive lines.

The recording medium can be printed in a forward or reverse direction. Preferably the forward feed of the recording medium occurs at the end of a line.

DESCRIPTION OF THE PREFERRED EMBODIMENT

Figure 1:
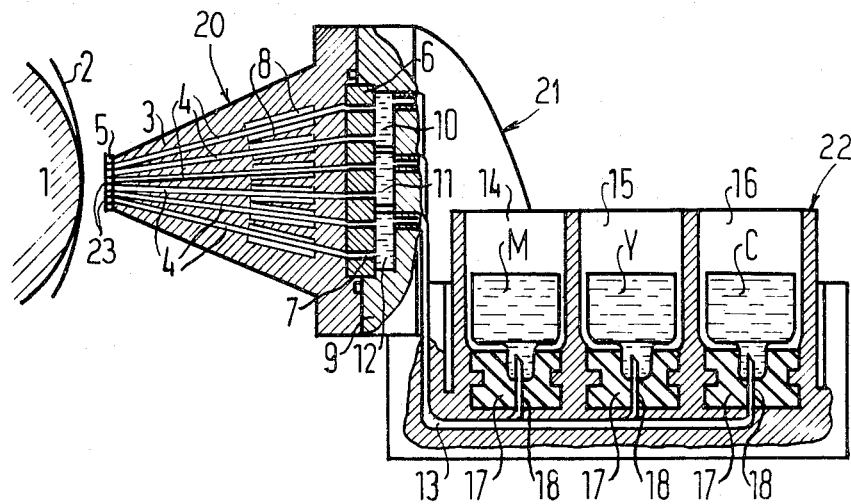
FIG. 1 is a cross-sectional view through a printer head unit for printing multi-colored patterns on a recording medium in accordance with the present invention.

The principles of the present invention are particularly useful in a piezoelectrically operated printer head generally indicated at 20 in FIG. 1. The printer head 20 is part of an ink printing unit 21 which includes the printing head and an appurtenant ink supply 22. The ink printing unit 21 may be arranged on the carriage of a known printing station to move in line fashion along a data carrier 1 to print a recording medium 2 mounted along the carrier in response to a conventional character generator (not shown). In contrast with past ink printing heads which print characters in only one color, preferably black, the ink printing unit 21 of the present invention enables the printing head to make multi-colored presentations on the recording medium 2, including alpha-numerical characters and graphical patterns, such as half-toned pictures.

Figure 2:
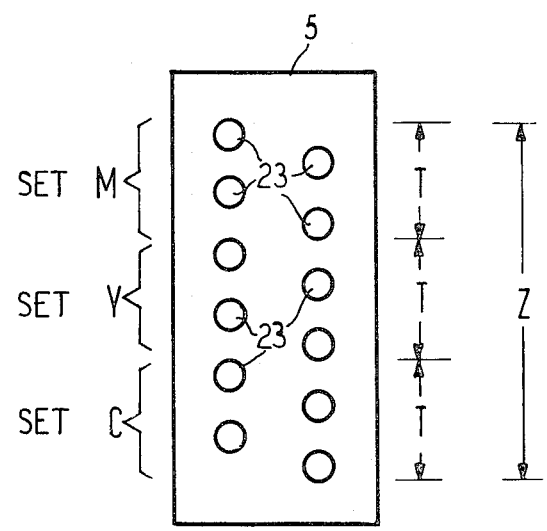
FIG. 2 is a front view of a jet plate for an ink printing head in accordance with the present invention.

The printer head 20 has a body 3 which consists of a single member in the form of a cass component of dielectric synthetic material containing several straight channels or passages 4 designed to receive a printing liquid or ink flow. The passages 4 serve as jet channels and terminate at a discharge end in restricted orifices or jets 23 formed in a jet plate 5. For purposes of illustration in the preferred embodiment, the printing head may contain twelve jets and jet channels 4 arranged in a pattern of two rows as illustrated in FIG. 2. Ink droplets are injected from the jets on paths perpendicular to the recording medium 2. The jet rows define two parallel vertical planes. Corresponding jet channels 4 extend rearward from the jet plate in diverging patterns along the planes.

The rear end of each of the channels 4 communicates with a corresponding restricted passage 7 formed transversely through a throttle plate 6. During start-stop operations, these narrow bores 7 of the throttle plate prevent pressure fluctuations from having any effect on the printing jets. Each jet channel 4 is concentrically surrounded therealong by a separate piezoelectric drive element 8. Upon application of a voltage to one or more of the drive elements 8, a channel portion is contracted to generate a pulse which causes ejection of an ink droplet from the jet plate 5 through a corresponding jet. Ink is supplied to the jet channels 4 via ink manifold or distributor chambers 10 through 12 formed in an end portion 9 fitted at the rear of the printer head body 3. Each manifold chamber communicates respectively with a particular set of jet channels 4. In the given instance, four respective jet channels 4 are connected through the throttle plate 6 with each of the manifold chambers 10–12. The manifold chambers 10–12 are supplied with ink via corresponding supply lines 13 which are in fluid communication at their inlet ends with corresponding, individual ink reservoirs 14–16. The ink reservoirs 14–16 are arranged one behind the other in a direction perpendicular to the recording medium 2 in the ink reservoir station 22 behind the printer head 20. This particular arrangement of the ink reservoirs serves to better balance the printing unit 21 and obviate pressure shocks upon acceleration of the printer along the carrier 1. The ink reservoir station 22 includes three successive cup or pot portions serving as the reservoirs 14–16. Pressed in the bottom of each reservoir, is a rubber seal 17 which is penetrated by a respective hollow needle 18 when the ink reservoirs are assembled onto the printing unit 21. The needles 18 extend respectively to the supply lines 13, thus producing the ink supply connection to the printing head 20. Somewhere along the fluid supply path between the ink reservoirs 14–16 and their corresponding jet channels 4 are respective filter devices (not shown) which are provided to retain dirt particles in the inks.

Preferably, the ink reservoirs 14 through 16 contain inks M,Y, and C of the primary colors megenta, yellow, and blue (such as cyan blue) respectively. The ink M with the color megenta is supplied to an uppermost group of jets via the manifold chamber 10. The ink Y with the color yellow is supplied to a middle group of jets through manifold chamber 11 and the ink C with the color cyan blue is separately provided to a lowermost group of jets via the manifold chamber 12. As illustrated in FIG. 2, the jets 23 are arranged in two parallel rows. The magenta ink M is ejected from the uppermost four jets designated Set M; whereas the yellow ink Y discharges from the middle four jets identified as Set Y and the cyan blue ink C passes from the lowermost four jets grouped together as Set C.

During a printing operation in which the ink printer 21 makes line-wise presentations on the recording medium 2, the recording medium 2 is threaded around the carrier 1 and the ink printing head 20 is moved line-wise along the carrier. Passage of the printer head along the recording medium enables the totality of jets to print a composite line of the vertical length Z, represented by the distance between the uppermost and lowermost jet opening surfaces on the jet plate 5. The line Z is represented on the recording medium 2 as consisting of three partial lines of the colors magenta, yellow, and cyan blue which are spaced apart from one another by a distance T. After each end of the printing of a line Z, the recording medium 2 is displaced perpendicularly to the printing direction by the width T of partial line. The distance T corresponds to the vertical width between jet opening surfaces at the uppermost and lowermost ends of the jet groups on the plate 5. According, the recording medium 2 is printed at all locations with each of the individual colors supplied to the printer head 20.

Displacement of the recording medium 2 by a respective partial line T enables printing of the recording medium 2 not only in the primary colors magenta, yellow, and cyan blue, but also in secondary colors derived from the mixture of these primary colors by means of successive, superimposed printing. For example, to represent a green color, the colors cyan blue and yellow are printed one over the other; for presenting a violet color, the colors magenta and cyan blue are printed one over the other; and for representing the color red, the colors magenta and yellow are printed one over the other. Half-tone representations may be effected by control of the plurality of droplets printed one over the other and/or next to one another per surface unit of the recording medium 2.

The ink printing device 21 can print the recording medium 2 line-by-line in a forward direction and/or in the reverse direction. In each case, however, the recording medium 2 is indexed perpendicularly to the print line by a partial line distance T at the end of the composite line Z. The recording medium may be printed in only one direction of motion of the ink printing head, wherein the recording medium 2 is indexed the distance T during the return movement of the printer head or is continuously indexed during the printing and during the return.

The principles of the present invention may be practiced with further ink colors. A four-color print may be provided by adding a fourth ink reservoir containing the color black in addition to the ink reservoirs containing the primary colors magenta, yellow, and cyan blue. The fourth ink reservoir would be similarly connected to a particular plurality of jets. If an ink printing head were used with the four ink reservoirs or formed with the twelve jets; then, respective sets of three jets each would eject ink of the same color and each partial line distance T would be designated by the vertical width between upper and lower jet opening surfaces of a jet group. In this case, the composite line Z would be formed of four partial lines.

Although various minor modifications may be suggested by those versed in the art, it should be understood that I wish to employ within the scope of the patent warranted hereon all such modifications as reasonably and properly come within the scope of my contribution to the art.

I claim as my invention:

1. An ink printing unit for multi-colored printing of a recording medium comprising a printer head with a plurality of groups of plural printing jets from which ink is ejected onto the recording medium, a plurality of ink reservoirs containing inks of different colors and means for fluidly connecting each of said ink reservoirs exclusively with a respective group of plural printing jets.

2. The ink printing unit of claim 1, wherein said printing jets are arranged in a pattern on one surface of said printer head such that printing jets respectively supplied with ink of same color are adjacent one another.

3. The ink printing unit of claim 1, further comprising means for mounting said ink reservoirs side-by-side with one another along a line perpendicular with the longitudinal axis of the recording medium.

4. The ink printing unit of claim 1, further comprising means for mounting said ink reservoirs adjacent said printer head, therebeing three ink reservoirs, said three ink reservoirs containing, respectively, inks of primary colors.

5. The ink printing unit of claim 4, wherein said respective inks in said three ink reservoirs are of the colors magenta, yellow, and cyan blue, and said mounting means further supporting a fourth ink reservoir containing ink of a black color.

6. The ink printing unit of claim 1, wherein said plurality of printing jets numbers twelve jets arranged in a pattern on one surface of said printer head such that jets respectively supplied with ink of the same color are adjacent to one another, each said group of jets being four jets.

7. The ink printing unit of claim 1, further comprising means for operating said printer head to print said recording medium in a linear printing direction between opposed print line ends, said groups of printing jets being symmetrically arranged in line with one another along a longitudinal axis perpendicular to the printing direction, said groups of printing jets defining widths along said longitudinal axis between longitudinally spaced upper and lower jet surfaces, said widths all being equal, and means for indexing the recording medium perpendicularly to the printing direction by a length equal to the width of a printing jet group.

8. The ink printing unit of claim 7, wherein said means for indexing the recording medium operates to displace the recording medium at the end of the printed line.

9. The ink printing unit of claim 7, wherein said means for indexing the recording medium operates to displace the recording medium continuously during printing and during the return of said printer head.

10. A method of providing multi-colored printing of a recording medium using a printer head with a plurality of printing jets from which ink is ejected onto the recording medium, said printing jets being arranged in a pattern on one surface of said printer head and divided into a plurality of groups of plural printing jets in a line with one another, a plurality of ink reservoirs containing inks of different colors, and flow means for exclusively supplying ink from each said ink reservoir to a respective printing jet group, said method comprising:
printing the recording medium from all said printing jet groups simultaneously while moving said printer head in line-wise fashion across the recording medium,
extending said line of jet groups perpendicular to the line of movement of said printer head,
arranging each said printing jet group with a width in parallel with said group line between longitudinally spaced leading and trailing jet surfaces, all said group widths being equal,
indexing the recording medium perpendicularly to the line of movement of said printer head by a length equal to the group width.

11. The method of providing multi-colored printing of claim 10, wherein said indexing occurs at the end of a printed line.

* * * * *